March 21, 1967 W. G. McCLEAN 3,310,246
STRAND WINDING MACHINE
Filed Dec. 16, 1963 3 Sheets-Sheet 2
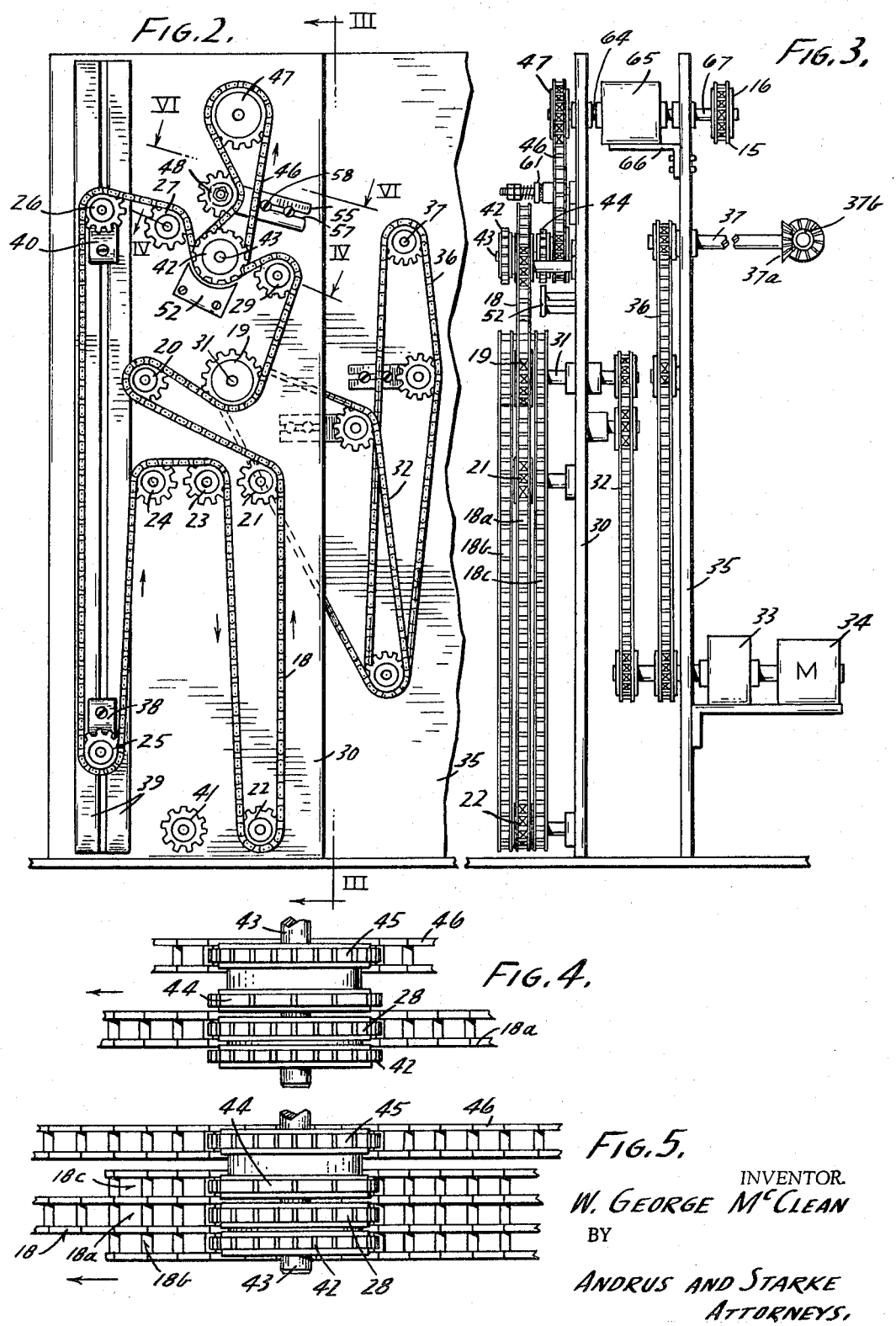
INVENTOR.
W. GEORGE McCLEAN
BY
ANDRUS AND STARKE
ATTORNEYS.

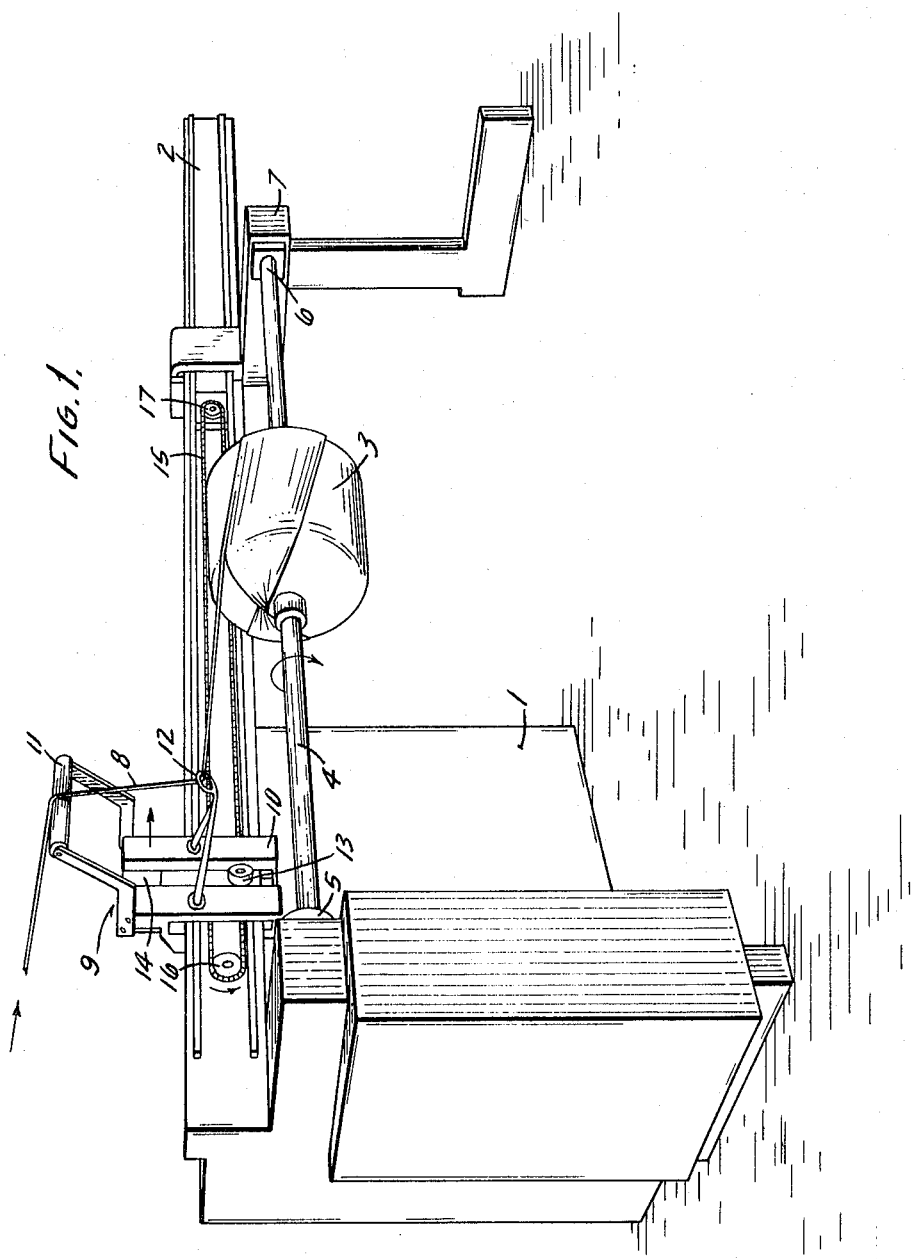

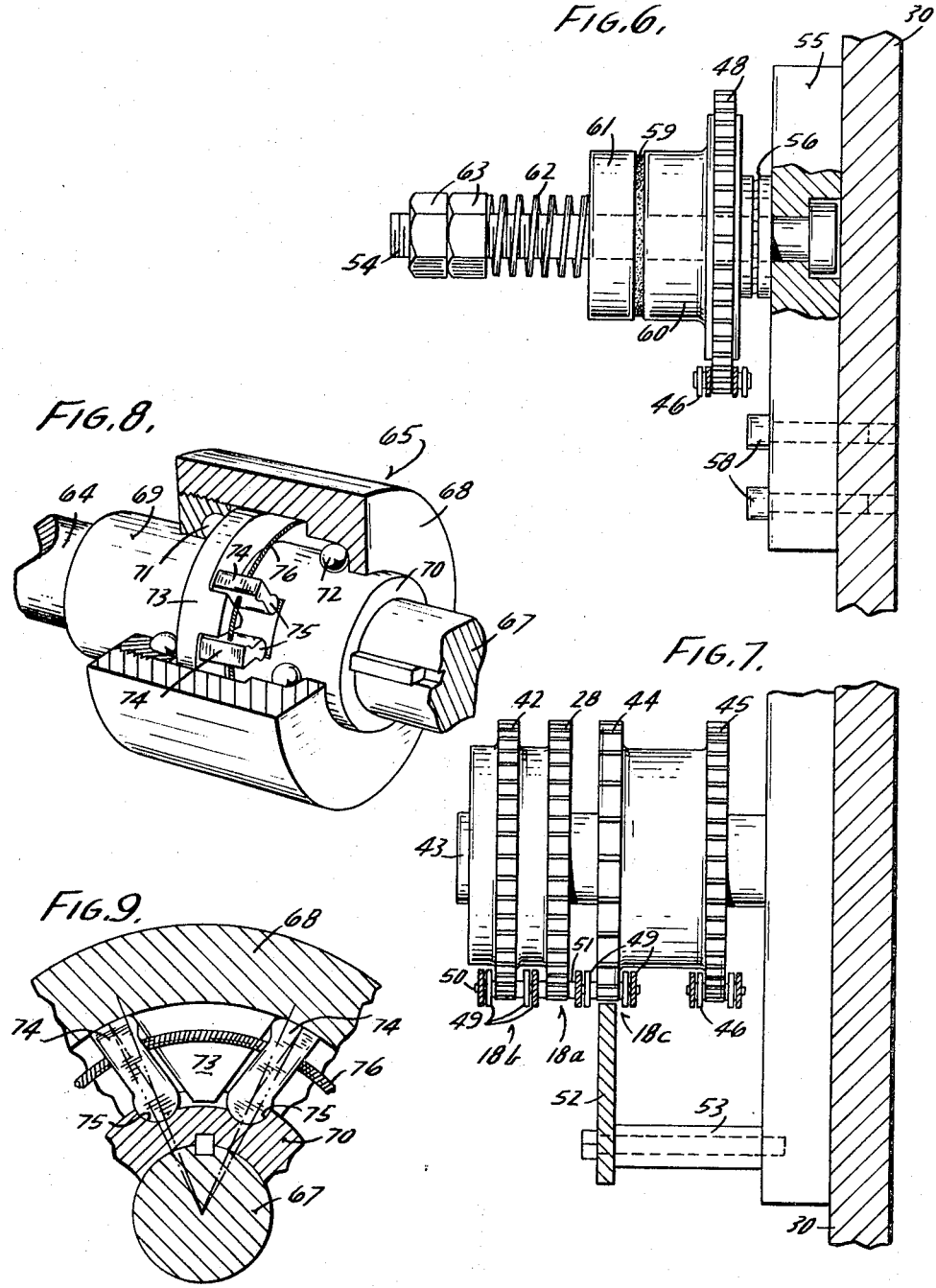

United States Patent Office 3,310,246
Patented Mar. 21, 1967

3,310,246
STRAND WINDING MACHINE
William George McClean, Milwaukee, Wis., assignor to McClean-Anderson, Inc., Milwaukee, Wis., a corporation of Wisconsin
Filed Dec. 16, 1963, Ser. No. 330,919
5 Claims. (Cl. 242—2)

This invention relates to a drive unit and more particularly to a chain drive having a dwell mechanism which can be utilized for driving the winding head of a filament winding apparatus.

Tubular reinforced plastic articles are generally fabricated by winding a strand or filament of reinforcing material coated with resin about a mandrel in a generally helical pattern. In the usual process, the mandrel is rotated and the reinforcing strand is guided onto the mandrel by a winding head which reciprocates along the length of the mandrel to wind the strand in a series of superimposed layers with each layer having the opposite helix angle. The particular helix angle to be employed in the winding operation is determined by the relative speed between the mandrel rotation and the reciprocation of the winding head.

In some winding operations it is desirable to provide a period of dwell for the winding head. For example, it may be desired to wind a reinforcing flange or ridge in the tubular article, in which case the motion of the winding head is stopped and the strand is applied circumferentially to build up the desired ridge. In other situations where a very shallow or low helix angle is employed, the winding head must necessarily move beyond the end of the mandrel before returning in its opposite stroke of travel. In this situation, where the strand overrides the mandrel, a slack condition is established in the strand which must either be taken up by a mechanical arm or by momentarily stopping the movement of the winding head.

The present invention is directed to a drive mechanism which can be applied to a filament winding operation to provide a period of dwell for the winding head. According to the invention, a chain is trained over a series of sprockets and is driven in an endless path. One of the sprockets is journalled on a shaft and the shaft also carries a second sprocket operably connected to a second chain which drives the winding head of the filament winding apparatus. A portion of the length of the first chain is single link, and a second portion of the length is multiple link. When the single link section of the chain is engaged with the first sprocket, there is no transfer of movement to the second chain drive, with the result that the winding head is stationary and does not move. However, the multiple link section of the chain will engage both the first sprocket and the second sprocket to thereby drive the second chain drive to move the winding head.

The drive mechanism of the invention provides a period of dwell which is determined by the proportional length between the single link section and the multiple link section of the chain. By varying the length of the single link section, the period of dwell can be increased or decreased as desired. Moreover, it is possible to obtain a considerable period of dwell without a large sized unit, for the period of dwell can be increased by merely increasing the proportionate length of the single link section of the chain.

The drive chain is driven continuously in the same direction and a positive starting and stopping action is imparted to the winding head or other object to be driven which prevents any loss of indexing and insures that the dwell will re-occur at the same period in the winding cycle.

While the drive mechanism of the invention is particularly adaptable to a filament winding operation, the drive mechanism can be used to drive various components in sequence from a primary drive member.

Other objects and advantages will appear in the course of the following description.

The drawings illustrate the best mode presently contemplated of carrying out the invention.

In the drawings:

FIG. 1 is a perspective view of a filament winding machine including the drive mechanism of the invention;

FIG. 2 is a rear elevation showing the chain drive mechanism;

FIG. 3 is a section taken along line 3—3 of FIG. 2;

FIG. 4 is a view taken along line 4—4 of FIG. 2 and showing the single chain section in engagement with the sprocket;

FIG. 5 is a view similar to FIG. 4 showing the triple chain section in engagement with the sprocket;

FIG. 6 is a side elevation with parts broken away in section showing the friction brake mechanism;

FIG. 7 is an enlarged section showing the keeper plate for aiding in the engagement of the triple link chain with the sprocket;

FIG. 8 is a perspective view with parts broken away in section showing the back-stopping clutch; and FIG. 9 is an enlarged fragmentary transverse section of the clutch of FIG. 8.

The drawings illustrate a filament winding apparatus which comprises a base cabinet or casing 1 and a generally horizontal beam 2 extends outwardly from the casing 1. A mandrel 3 is secured to a shaft 4 which is disposed generally parallel to the beam 2. One end of the shaft 4 is secured to a spindle 5 which is operably connected to a drive mechanism located within the casing 1. The other end of the shaft 4 is connected to a spindle 6 journalled within a tailstock 7 which is movable along the beam 2.

A strand 8 of reinforcing material is adapted to be wound on the outer surface of the mandrel 3 in a generally helical pattern to form a tubular article. The strand 8 can be in the form of substantially continuous unidirectional fibers, woven fabric, braided tubing, matting or the like. The fibrous material can be mineral fibers, such as glass or asbestos; vegetable fibers, such as cotton; animal fibers, such as wool; synthetic fibres, such as nylon, rayon or Dacron; or metal fibers, such as steel wire.

The strand 8 is impregnated or coated with a thermoplastic or thermosetting resin and the resin at the time the strand is wound on the mandrel can either be in the liquid uncured state or it can be in a partially cured, solid, deformable state. Glass fibers impregnated with an epoxide resin formed by the reaction of epichlorohydrin and bisphenol A, as disclosed in Patent 2,801,227, is a very satisfactory material to use in the winding operation.

The strand 8 is guided onto the mandrel 3 by a winding head 9 which is mounted for reciprocating movement on the beam 2. The winding head 9 includes a carriage 10 which is mounted on rollers for movement along the beam 2, and the carriage supports guide roller 11 and an annular guide member 12. The strand 8 passes over the roller 11 and through guide member 12 to the mandrel. The particular structure of the winding head 9 forms no part of the invention, and any suitable guide mechanism may be employed.

To reciprocate the winding head 9 along the beam 2, a slide 13 is slidably mounted in a vertical slot 14 formed in the carriage 10. The block 13 is rotatably secured to an endless chain 15 which is trained around a drive sprocket 16 and an idler sprocket 17. As the chain 15 is driven, the carriage 10 moves with the chain and as the carriage approaches one of the sprockets 16 and 17, the slide 13 will move vertically within the slot 14 to permit the slide 13 to follow the movement of the chain around the sprocket.

As shown in FIG. 1, the strand 8 is wound on the mandrel 3 with a very low or shallow helix angle. Upon reaching the end of its stroke of travel, the winding head will then reverse its travel and wind the strand on the mandrel with the opposite helix angle. Because of the shallow angle, the winding head will override the end of the mandrel, and the portion of the strand extending from the guide 11 to the mandrel will slacken. To prevent excessive overtravel of the winding head and thereby reduce the amount of slack, a chain drive mechanism is employed to provide a period of dwell for the winding head when it reaches its end point in its stroke of reciprocating travel. As best shown in FIG. 2, the drive mechanism includes an endless chain 18 which is trained around sprockets 19, 20, 21, 22, 23, 24, 25, 26, 27, 28 and 29 carried by plate 30. Sprocket 19 is the drive sprocket and is secured to a shaft 31 journalled within a bearing assembly 32 attached to plate 30. As shown schematically in FIGS. 2 and 3, shaft 31 is connected by a chain drive 32 to the output shaft of a variable speed transmission 33 driven by motor 34. The motor is mounted on a platform which extends outwardly from a wall 35 of casing 1.

The motor 34 also serves to drive the mandrel 3. In this regard, the output shaft of transmission 33 is connected by chain drive 36 to a shaft 37 and the shaft 37, in turn, drives the spindle 5 through a pair of miter gears 37a and 37b.

To tighten the chain 18, the sprocket 25 is journalled in a block 38 which is mounted for sliding movement within guides 39 on plate 30. Similarly, the sprocket 26 is journalled within a block 40 which is also slidable within the guides 39. The tension on the chain 18 can be adjusted by moving the blocks 38 and 40 within the guides 39 and locking the blocks in the desired position.

One or more additional sprockets, as indicated by 41, can also be mounted on the plates 30 and can be used if it is desired to employ a chain of greater length.

As best shown in FIGS. 4, 5 and 7, a sprocket 42 is secured to the sprocket 28 and the sprockets 28 and 42 are journalled on a shaft 43 which is mounted on the plate 30. In addition, the shaft 43 carries a pair of sprockets 44 and 45 which are secured together. Sprockets 44 and 45, while secured together, are freely rotatable on the shaft 43, as are the sprockets 28 and 42. A chain 46 is engaged with the sprocket 45 and travels around a pair of sprockets 47 and 48. Sprocket 47 is adapted to be operably connected to the chain drive 15 for the winding head 9, as subsequently described.

The chain 18 includes a central, single link section 18a which extends throughout the entire length of the chain. In addition, a pair of link sections 18b and 18c are attached to the section 18a. Sections 18b and 18c extend only through a portion of the entire length of the chain and are coextensive with each other. The chain 18 is a conventional roller link chain being formed of a series of links 49 which are pivotally mounted on pins 50. Roller 51 is located between adjacent pairs of links.

The section 18a is adapted to engage the sprocket 28 and the section 18b engages the sprocket 42. The sprocket 44 is spaced from the sprocket 28 a distance equal to the distance between the chain sections 18a and 18c so that the section 18c will engage the sprocket 44 and in turn cause the sprocket 45 to rotate to thereby drive the chain 46. When the single link section 18a rides over the sprocket 28, there will be no transmission of the motion of chain 18 to the chain 46. However, when the triple link section moves into engagement with the sprocket 28, the section 18c will engage the sprocket 44 to thereby drive the chain 46 and simultaneously drive the winding head. The chain section 18b is provided to balance the force of the chain section 18c driving the sprocket 44.

To insure that the sprocket 44 will engage the chain section 18c, the sprocket 44 is provided with a lesser number of teeth than the sprockets 28 and 42. For example, the sprocket 44 may have every other tooth eliminated so that the remaining teeth will be readily engaged with the chain. To guide and hold the link section 18c into engagement with the sprocket 44, a keeper plate 52 is mounted on a bar 53 attached to the plate 30. The upper edge of the plate 52 has a generally curved or arcuate shape and as the chain section 18c approaches the sprocket 44 the chain section rides along the curved edge of the plate 52 and into contact with the teeth of the sprocket. The plate 52 holds the chain section 18c in engagement with the sprocket teeth and insures that the chain will be properly indexed when it leaves the sprocket regardless of deflection in the chain.

A friction brake mechanism is associated with chain 46 to insure that the chain 46 will stop immediately when the chain section 18c moves out of engagement with the sprocket 44. In this regard, the sprocket 48, as shown in FIG. 6, is journalled on a shaft 54 which extends outwardly from a bracket 55. A thrust bearing 56 is located between the sprocket and the bracket 55. The bracket is provided with a slot 57 and a pair of bolts 58 extend through the slot and are threaded within openings in the plate 30. By loosening the bolts 58, the bracket 55 can be moved along the surface of the plate to adjust the tension on the chain 46.

A plastic washer 59 is disposed in contact with the outer end of the hub 60 of sprocket 48, and a steel washer 61 is keyed to the shaft 54 and bears against the washer 59. The washers 59 and 61 are urged against the hub 60 of the sprocket by a coil spring 62 which extends between the washer 61 and nuts 63 threaded onto the end of the shaft 54. The sprocket 48 rotates on the shaft 54 while the washer 61 is stationary and is keyed to the shaft. The friction between the rotating and fixed members provides frictional resistance which serves as a brake to stop the movement of chain 46 immediately after the chain section 18c moves out of contact with the sprocket 44.

As previously mentioned, the sprocket 47 is operably connected to the chain 15 which drives the winding head 9. The sprocket 47 is mounted on a shaft 64 which is journalled within a bearing located in an opening within plate 30. The shaft 64 is connected to the input member of a clutch 65 which is mounted on a bracket 66 secured to wall 35. The output member of the clutch 65 is connected to shaft 67 which carries the sprocket 16. The chain 46 drives the sprocket 47 which in turn drives the sprocket 16 through clutch 65 to move the winding head in reciprocating travel.

The clutch 65 is a back-stopping clutch which will transmit rotation of shaft 64 to shaft 67, but will prevent rotation of shaft 67 from being transmitted back to the shaft 64 and chain 46. The back-stopping clutch 65 serves to prevent the inertia of the winding head, due to the movement of the carriage and the tension of the strand, from driving the chain 46 in the reverse or forward direction after the chain section 18c has moved out of engagement with the sprocket 44. If the movement of the winding head were transmitted back through the chain 46, a loss of indexing would result which would cause the dwell period to be out of phase in the cycle.

FIGS. 8 and 9 illustrate a conventional back-stopping clutch 65 including an outer race or casing 68 which houses an input member 69, keyed to shaft 64, and an output member 70, keyed to shaft 67. The input member 69 and output member 70 are mounted for rotation within the casing 68 by ball bearing assemblies 71 and 72, respectively.

The inner surface of input member 69 is provided with a series of projecting V-shaped control elements 73 which extend between pairs of opposing sprags 74. The sprags 74 are socketed in half-round recesses 75 in the output member 70, and are maintained in position between the input and output members by a coil spring 76 which extends through openings in the sprags.

When input member 69 is rotated in either direction, the control elements 73 disengage one sprag of each set or pair and then drive the output member 70 through the base area of the same sprag. However, rotation of output member 70 provides an instant wedging action of the sprags 74 which locks the device against feed-back torque so that rotation of shaft 67 will not be transmitted back to the chain 46.

The invention provides a simple and positive mechanism for providing a period of dwell for the winding head of a filament winding apparatus. The length of the period of dwell can be readily adjusted by varying the length of portion of the chain length 18c in relation to the chain section 18a. In some cases, it might be advantageous to employ a series of chain sections 18c which extend for various lengths along the length of the main section 18a. This would result in a series of dwell periods during each cycle of rotation of endless chain section 18a.

The winding head is put into motion by engagement of the chain section 18c with the sprocket 44 which drives through the chain 46 to move the winding head. The engagement of the chain section 18c with the sprocket 44 provides a positive starting and stopping action which insures that the drive is locked in and prevents a loss of indexing between the members.

The drive mechanism of the invention is particularly useful in providing a period of dwell in a filament winding operation using a shallow helix angle in which the winding head overrides or goes beyond the end of a mandrel. The dwell minimizes over-travel of the winding head and thereby reduces the slack in the strand. The dwell mechanism can also be employed in a filament winding operation where it is desired to make a circumferential wrap at a desired location along the length of the mandrel, as for example, where it is desired to build up a rib or flange in the tubular article. In addition, the mechanism can be employed in a filament winding operation where it is desired to stop the movement of the winding head in order to perform any auxiliary operations on this article being formed.

While the above description is directed to the drive mechanism being utilized with a filament winding machine, it is contemplated that the drive system may be employed in any situation where it is desired to drive various components in a programed sequence from a primary drive source. The sprocket 42 has been described as an idler to be engaged by chain section 42 to balance the force of the chain section 18c driving sprocket 44. It is contemplated, however, that sprocket 42 can be operably connected to a separate output chain drive so that engagement of chain section 18b with sprocket 42 will drive the separate output drive in a programed sequence.

Similarly, while the drive chain 18 is shown as an endless member, it is contemplated that the primary drive member can reciprocate through a desired path of motion and can be rigid as well as flexible. In addition, the drive chain has been described as traveling in the direction of the arrows in FIG. 2, but the direction of chain travel can be reversed and the drive mechanism will function in the same manner.

Various modes of carrying out the invention are contemplated as being within the scope of the following claims particularly pointing out and distinctly claiming the subject matter which is regarded as the invention.

I claim:

1. A filament winding apparatus, comprising an endless flexible drive member, means for driving the endless member in a path of travel, a second flexible drive member connected to said endless member and extending only along a portion of the length of said endless member, an output member located adjacent the path of travel of said endless member and disposed to be intermittently engaged by said second drive member as said endless member moves in its path of travel, a mandrel, means for rotating the mandrel, winding head means for winding a strand on the mandrel in a generally helical pattern, and means interconnecting the output member and the winding head means whereby engagement of said second drive member with said output member results in movement of said winding head means and disengagement of said second drive member with said output member results in a period of dwell for said winding head means.

2. The structure of claim 1 and including means associated with said connecting means for preventing feedback of movement from said winding head means to said output member.

3. The structure of claim 1 and including a backstopping clutch operably associated with said connecting means for transmitting torque from the output member to said winding head means to thereby drive the winding head means in a reciprocating path of travel and for preventing the transfer of torque from said winding head means back to said output member.

4. A chain drive mechanism comprising a drive mechanism comprising a drive chain, means for driving the chain in the path of travel and including a first drive sprocket engaged with said chain, a chain section secured to the drive chain and extending only along a portion of the length of said drive chain, a second sprocket located adjacent the path of travel of said drive chain and disposed to be intermittently engaged by said chain section as the drive chain moves in its path of travel, a mandrel, means for rotating the mandrel, winding head means for winding a strand on the mandrel in a generally helical pattern, said second sprocket having a lesser number of teeth than the first sprocket to thereby insure engagement of the second sprocket with said chain section, and means interconnecting the second sprocket and the winding head means whereby engagement of said chain section with said second sprocket results in movement of said winding head means and disengagement of said chain section with said second sprocket results in a period of dwell for said winding head means.

5. A chain drive mechanism comprising a drive chain, means for driving the chain in the path of travel and including a first drive sprocket engaged with said chain, a chain section secured to the drive chain and extending only along a portion of the length of said drive chain, a second sprocket located adjacent the path of travel of said drive chain and disposed to be intermittently engaged by said chain section as the drive chain moves in its path of travel, a mandrel, means for rotating the mandrel, winding head means for winding a strand on the mandrel in a generally helical pattern, a plate member having a generally curved surface disposed in spaced relation to the teeth of said second sprocket, said plate being arranged to hold said chain section in engagement with said second sprocket, and means interconnecting the second sprocket and the winding head means whereby engagement of said chain section with said second sprocket results in movement of said winding head means and disengagement of said chain section with said second sprocket results in a period of dwell for said winding head means.

References Cited by the Examiner

UNITED STATES PATENTS

| | | | |
|---|---|---|---|
| 1,775,029 | 9/1930 | Hippenmeyer | 74—84 X |
| 3,086,405 | 4/1963 | Fleming | 74—84 X |
| 3,093,344 | 6/1963 | Lamb | 242—158.4 |
| 3,106,504 | 10/1963 | Carter | 242—7 X |

FOREIGN PATENTS 6,366      1941    Japan.

FRANK J. COHEN, *Primary Examiner.*

MERVIN STEIN, B. S. TAYLOR, *Assistant Examiners.*